United States Patent [19]

Su

[11] Patent Number: 4,922,479

[45] Date of Patent: May 1, 1990

[54] OPTICAL TIME SLOT INTERCHANGER USING ONE-BIT MEMORY CELLS

[75] Inventor: Shing-Fong Su, Southboro, Mass.

[73] Assignee: GTE Laboratories Incorporated, Waltham, Mass.

[21] Appl. No.: 289,637

[22] Filed: Dec. 23, 1988

[51] Int. Cl.⁵ .................. H04J 14/00; H04J 14/08; H04B 10/00

[52] U.S. Cl. .................................. 370/1; 370/4; 455/600

[58] Field of Search ............. 455/600, 601, 606, 607, 455/608, 609, 610, 611, 612, 613, 617, 618, 619; 370/1, 3, 4

[56] References Cited

U.S. PATENT DOCUMENTS

| | | | |
|---|---|---|---|
| 3,739,173 | 6/1973 | Broussard | 370/112 |
| 4,608,682 | 8/1986 | Nagashima | 370/4 |
| 4,748,617 | 5/1988 | Drenlo | 455/612 |
| 4,761,060 | 8/1988 | Sawano | 350/354 |
| 4,811,210 | 3/1989 | McAulay | 370/1 |

FOREIGN PATENT DOCUMENTS 0254991 12/1985 Japan .................................. 370/4

OTHER PUBLICATIONS

An Ultra Fast All-Optical Switch.
R. A. Thompson and P. P. Giordiano, "An Experimental Photonic Time-Slot Interchanger Using Optical Fibers as Reentrant Delay-Line Memories", J. Lightwave Technology, vol. LT-5, pp. 154–162, Jan. 1987.
H. Goto, "Photonic Time-Division Switching Technology", Technology Digest, Topical Meeting on Photonic Switching, pp. 132–134, Mar. 1987.

*Primary Examiner*—Joseph A. Orsino
*Assistant Examiner*—L. Van Beek
*Attorney, Agent, or Firm*—James J. Cannon, Jr.

[57] ABSTRACT

An optical time slot interchanger which interchanges one optical pulse at a time in a bit interleaved format. The optical time slot interchanger is constructed from an N-bit serial-to-parallel converter and N optical memory cells, each of said optical memory cells being optically coupled to a parallel output port of said optical-to-serial converter. The ouputs of all N optical memory cells are optically coupled to form a single output port for the time slot interchanger. The optical time slot interchanger has a single input port to receive serially a frame of N optical pulses and a single output to present serially said frame of pulses with interchanged time slots. As a frame of N optical pulses enters the optical time slot interchanger, they are shifted and stored in said optical serial-to-parallel converter under the control of clock means. The optical pulses are then shifted to optical memory cells to await serial output in a time slot interchange under control of other clock signals.

6 Claims, 1 Drawing Sheet

OPTICAL TIME SLOT INTERCHANGER USING ONE-BIT MEMORY CELLS

BACKGROUND OF THE INVENTION

This invention relates to optical components generally, that is, components which operate in the optical domain. Such components are designed for use in various systems which utilize optical fibers, such as optical communications systems, optical data processing systems and optical switching systems. Specifically, this invention pertains to an optical time slot interchanger.

The development of optical fiber and optical semiconductor technologies in recent years has made possible various types of optical communications systems and optical switching systems. To utilize the full bandwidth and speed available in optical systems, it has become necessary to design and fabricate optical logic and switching components which eliminate the necessity for electrical-to-optical and optical-to-electrical conversions.

With future communications networks being envisioned to have terabit capacity, light-speed transmission alone does not suffice for the full utilization of available bandwidth. Ultra-high-speed switching will also be necessary. At present, the high bandwidth advantage of optical fibers is still not fully utilized because electronic switching systems are not fast enough for high speed and high throughput optical switching. To solve this problem, the switching functions must be performed in the optical domain. Switching and multiplexing with the speed of light is necessary. Consequently, the success of terabit networks now relies on the successful development of photonic switching and signal processing systems. Since no electrical-to-optical or optical-to-electrical conversion will be allowed in these systems, pure optical subsystems, such as optical memory cells, optical shift registers, optical serial-to-parallel converters and optical parallel-to-serial converters will play important roles in these systems.

While space-division photonic switching has been successfully demonstrated, progress in time-division photonic switching is very slow. In existing optical time-division switching systems, the time slot interchange is accomplished by using the demultiplexing/storing/retrieving/multiplexing procedure. Examples may be found in R. A. Thompson and P. P. Giordano, "An experimental photonic time-slot interchanger using optical fibers as reentrant delayline memories," J. Lightwave Technology, vol. LT-5, pp. 154–162, Jan. 1987, H. Goto, "Photonic time-division switching technology," Technical Digest, Topical Meeting on Photonic Switching, pp. 132–134, Mar. 1987. In the prior art, optical write gates, bistable devices and optical read gates are often employed in such systems. The invention of optical memory cells, optical shift registers and optical serial-to-parallel converters will provide system designers with alternative approaches in designing optical time-division switching systems.

It is presently anticipated that optical time slot interchangers will play an important role in optical switching systems such as self-routing optical switching systems and optical ring switching systems. In these switching systems, the use of optical time slot interchangers will simplify the design of the systems and improve their performance.

SUMMARY OF THE INVENTION

The principal object of the present invention is to provide an optical time slot interchanger which interchanges one optical pulse or bit at a time in a bit interleaved format.

Another object of the invention is to provide an optical time slot interchanger in which optical bits are interchanged without optical-to-electrical or electrical-to-optical conversion.

Another object of the invention is to provide an optical time slot interchanger in which adjacent optical pulses are well isolated, causing no crosstalk among time slots.

Still another object of the present invention is to provide an optical time slot interchanger which is simple in both structure and operation, but which has none of the shortcomings of prior combinations of optical devices or electronic equivalents when used in optical systems.

A further object of the invention is to provide an optical time slot interchanger in which the speed of the time slot interchanger may be adjusted to match the incoming optical data rate.

Still a further object of the invention is to provide an optical time slot interchanger for which the control timing is simple.

Another object of the invention is to provide an optical time slot interchanger which can be implemented using integrated optics technology.

This invention is an optical time slot interchanger which interchanges one optical pulse or bit at a time in a bit interleaved format. It comprises an optical serial-to-parallel converter having one optical memory cell optically coupled to each of the parallel outputs of said converter and the outputs of the memory cells optically coupled to form an output for the interchanger. The optical time slot interchanger has a single input to receive serially a frame of optical pulses and a single output to present said frame of pulses sequentially according to time slot assignment. Said optical serial-to-parallel converter is constructed from a plurality of cascaded optical shift registers and 1×2 optical switches.

In one aspect of the invention, an optical time slot interchanger, for an incoming optical data stream containing only two optical pulses or bits in each frame with each bit occupying one time slot, comprises a two-bit optical serial-to-parallel converter consisting of two cascaded single bit optical shift registers and two 1×2 optical output switches. One single bit optical memory cell is optically coupled to each of said optical output switches. The outputs of the two optical memory cells are optically coupled by a two-to-one optical combiner to form the single output of the optical time slot interchanger. As optical pulses enter the optical converter, they are shifted from the first optical shift register to the next until all optical shift registers are full. At this point, the optical output switches change to the cross-over state and all optical pulses in the optical converter appear on its outputs simultaneously, the first optical pulse entering an optical memory cell, while the second optical pulse bypasses a second optical memory cell and is switched directly to the output of the optical time slot interchanger. At the same time, the first optical pulse of the next frame enters the optical time slot interchanger. This enter-shift-exit cycle repeats at the rate of a first and a second clock in the optical converter. The second optical pulse in each frame exits before the first. Thus, the time slot interchange between the first and the second optical pulses or bits in each frame is completed.

In a second aspect of the invention, a multibit optical time slot interchanger is constructed by using a multibit optical serial-to-parallel converter and multiple optical memory cells. For N optical pulses or bits in a frame, to be time slot interchanged, an N-bit optical serial-to-parallel converter having N optical shift registers is required, as well as N single bit optical memory cells coupled to the N outputs of the converter. There is no change in the operational principles.

The above and other objects, features and advantages of this invention are illustrated in the following detailed description, in which reference is made to the accompanying drawings.

DESCRIPTION OF THE PREFERRED EMBODIMENTS

Figure 1:
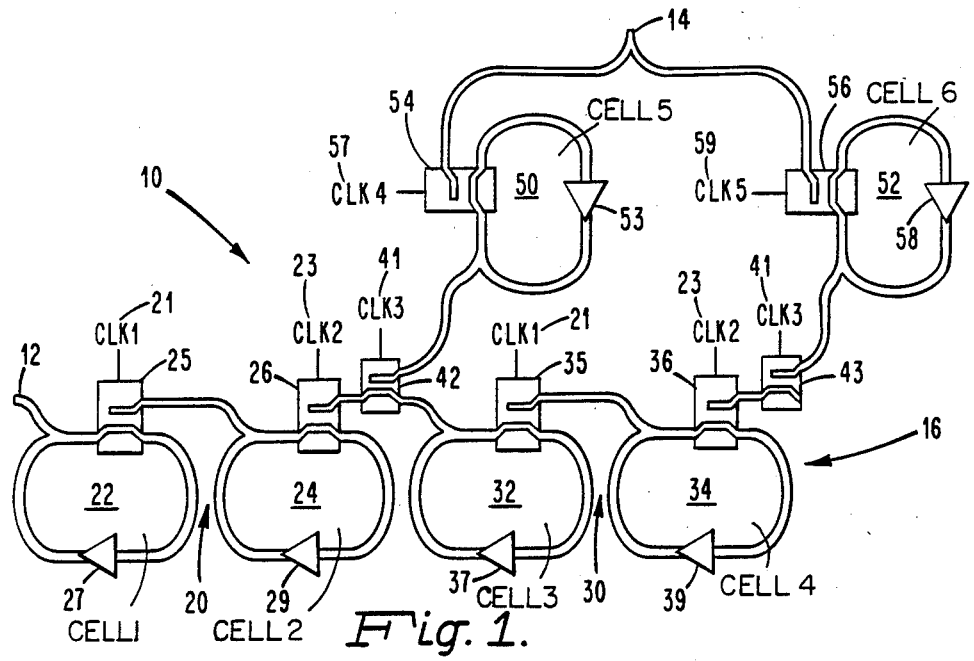
FIG. 1 is a diagrammatic illustration of the preferred embodiment of a two-bit optical time slot interchanger according to the present invention.

FIG. 1 is a diagrammatic illustration of the preferred embodiment of an optical time slot interchanger 10 constructed in accordance with the principles of the present invention. For simplicity of exposition, we assume that each frame of the incoming optical data stream contains only two bits or two optical pulses, with each bit occupying one time slot. Optical time slot interchanger 10 has a single input port 12 to receive serially a frame of two optical pulses and one output port 14, to output said pulses serially with their time slots interchanged. Optical time slot interchanger 10, in the embodiment illustrated, comprises a two-bit optical serial-to-parallel converter 16 and two single bit optical memory cells 50, 52. Optical serialto-parallel converter 16, in turn, consists of two cascaded single bit optical shift registers 20, 30, each single bit optical shift register comprising two cascaded single bit optical memory cells, 22, 24, 32, 34. The optical memory cell described and illustrated herein has been disclosed in a copending U.S. patent application entitled OPTICAL MEMORY CELL, filed Dec. 5, 1988 by the inventor of this application and assigned to the same assignee as this application. The optical shift register described and illustrated herein has been disclosed in a copending U.S. patent application entitled OPTICAL SHIFT REGISTER, filed Dec. 5, 1988 by the inventor of this application and assigned to the same assignee as this application. The optical serial-to-parallel converter described and illustrated herein has been disclosed in a copending U.S. patent application entitled OPTICAL SERIAL-TO-PARALLEL CONVERTER, filed Dec. 19, 1988, by the inventor of this application and assigned to the same assignee as this application. These related applications are incorporated herein by reference, and specifically the drawings and the descriptions of the preferred embodiments are incorporated herein by reference with respect to the structure and operation of said single bit optical memory cell, said single bit optical shift register, and said two-bit optical serial-to-parallel converter.

Memory cells 22, 32, are controlled by a first clock 21, while memory cells 24, 34 are controlled by a second clock 23, and said memory cells include 1×2 optical switches 25, 26, 35, 36 and optional optical amplifiers 27, 29, 37, 39. The optical amplifiers are used to compensate for the optical losses caused by the various optical components in the system. Single bit optical shift registers 20, 30 are cascaded to form optical two-bit serial-to-parallel converter 16 by adding to each a third optical output switch 42, 43 controlled by a third clock 41. Each output optical switch 42, 43 is connected to the output of its respective optical shift register in optical serial-to-parallel converter 16. The cross-over outputs of switches 42, 43 are optically coupled to the inputs of single bit optical memory cells 50, 52 respectively. The outputs 54, 56 of optical memory cells 50, 52 are optically combined into a single output which is the output port 14 of optical time slot interchanger 10.

Figure 2:
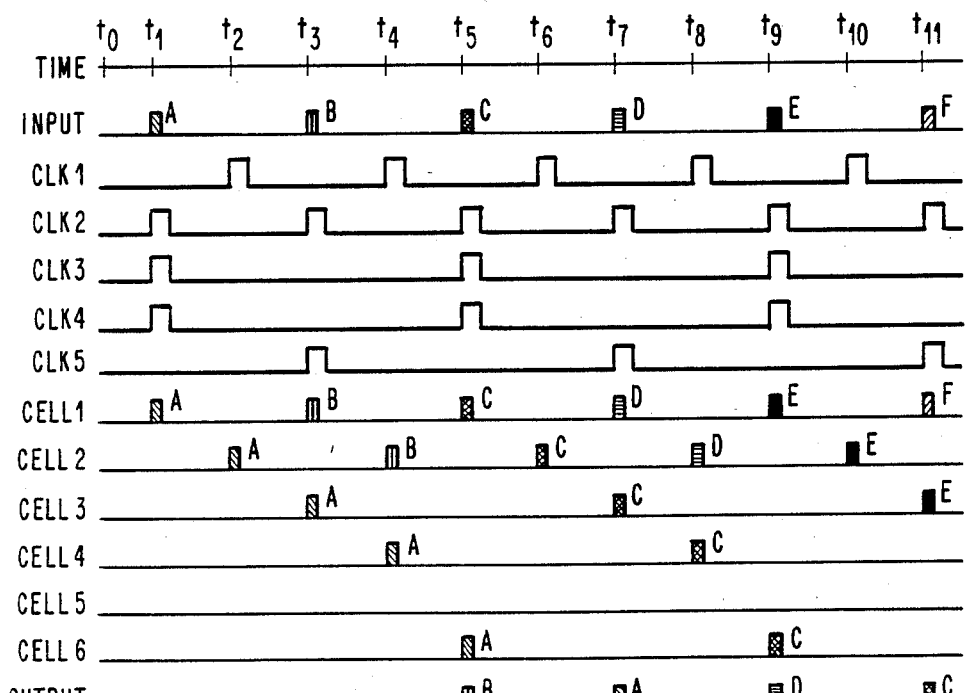
FIG. 2 is a timing control diagram of the two-bit optical time slot interchanger of FIG. 1.

The operation of the single bit optical memory cell, the single bit optical shift register and the two-bit serial-to-parallel converter have been disclosed in the cross-referenced applications. For this disclosure, we point out that shifts of the optical bits in the optical serial-to-parallel converter 16 are gated by optical switches 25, 26, 35, 36. Optical bit shifts from optical converter 16 to optical memory cells 50, 52 are gated by optical switches 42, 43 respectively. Time slot interchanges are achieved by controlling switches 54, 56 of memory cells 50, 52 respectively. Each optical switch is controlled by a clock. Optical switches 25, 35 are controlled by clock 21; optical switches 26, 36 are controlled by clock 23; optical switches 42, 43 are controlled by clock 41; and optical switches 54, 56 are controlled by clocks 57, 59 respectively. All of the optical switches are in the cross-over state when their controlling clocks are high. They are in the straight-through state when their controlling clocks are low. The clock signals may be optical or electrical, depending on the types of optical switches used. If the optical switches are $LiNbO_3$-based directional couplers or cross-couplers, the clock signals are electrical. If the optical switches are pure optical switches, then the clock signals are optical. As shown in FIG. 2, clocks 21 and 23 run at the same rate, but out of phase with each other. The rate of clocks 21, 23 is flexible. It can be adjusted to match the incoming optical data rate. The rate of clock 41, is given by the rate of clock 23 divided by N, where N is the number of bits or optical pulses in a frame. In the example described and illustrated, clock 41 runs at one-half the rate of clock 23 for a two-bit frame. The duty cycles of all clocks in optical time slot interchanger 10 are less than fifty percent. This prevents adjacent optical pulses from being mixed together. The optical amplifiers 27, 29, 37, 39, 53, 58 are used to compensate for the optical losses caused by the various optical components in time slot interchanger 10. These optical amplifiers could be discrete components or distributed optical fiber amplifiers. Preferably, the optical amplifiers should have threshold-amplifying capability; only signals but not noises are amplified.

To elucidate the operation of the optical time slot interchanger 10, we assume that it is empty at the beginning. For the embodiment illustrated, we also assume that each frame in the incoming data stream contains only two bits or optical pulses, with each bit occupying one time slot. As shown in FIG. 2, the first frame contains optical bits A and B, and the second frame contains optical bits C and D. At $t=t_1$, clock 21 is low, switch 25 is in the straight-through state, and optical pulse A enters memory cell 22 through input port 12. At $t=t_2$, clock 21 is high, clock 23 is slow, switch 25 is in the cross-over state, and optical pulse A shifts to memory cell 24. At t=t₃, clock 21 and clock 41 are low, clock 23 is high, switch 42 is in the straight-through state, and optical pulse A shifts from memory cell 24 in shift register 20 to memory cell 32 in shift register 30 through optical switch 42 under the control of clock 41. At the same time, optical pulse B enters time slot interchanger 10 through input 12 to memory cell 22. At t=t₄, optical pulse A shifts to memory cell 34 and optical pulse B shifts to memory cell 24. At t=t₅, clocks 23, 41 and 54 are high, permitting optical pulse B to exit through output port 14 via switches 26, 42 and 54, while optical pulse A shifts from memory cell 34 to memory cell 52 via optical switches 36, 43 under the control of clock 41. At the same time, optical pulse C enters memory cell 22 through input port 12. At t=t₆, optical pulse C shifts from memory cell 22 to memory cell 24. At t=t₇, optical pulse A exits from output port 14 via switch 56, optical pulse C shifts from memory cell 24 to memory cell 32, and optical pulse D enters memory cell 22 through input port 12. Thus, the time slot interchange between optical pulse A and optical pulse B in the first frame is completed. At t=t₈, optical pulse C shifts from memory cell 32 to memory cell 34 and optical pulse D shifts from memory cell 22 to memory cell 24. At t=t₉, optical pulse D exits from output port 14, signifying the beginning of the second frame after the interchange. The operational process described above is summarized in Table 1.

It should be noted that the incoming and outgoing optical data rates are equal. It should also be noted that clocks 57 and 59 are out of phase with each other, but run at the same rate, which is equal to the rate of clock 21 divided by N, where N is the number of bits or pulses per frame. For the time slot interchanger 10 described and illustrated, N=2. The maximum delay for any bit in this time slot interchanger is 2N−1 cycles of clock 21, because the first bit of a frame may become the last bit of the same frame after the interchange. Although only two bits per frame are used in the example illustrated in FIGS. 1 and 2, this is sufficient to demonstrate the concept and the architecture of the invention. It should be noted in this respect that no optical pulse was stored in memory cell 50 in the two-bit per frame example. However, this memory cell is necessary, as will be explained below.

While FIG. 1 shows only a two-bit per frame optical time slot interchanger, it should be obvious to one skilled in the art to extend the architecture to a multibit optical time slot interchanger. Multibit optical time slot interchangers can be constructed by using a multibit optical serial-to-parallel converter and multiple optical memory cells. The principles of operation do not change at all. For N serial bits or optical pulses in a frame to be time slot interchanged, N single bit optical memory cells must be optically coupled to the parallel outputs of an N bit optical serial-to-parallel converter for the temporary storage of the optical pulses. The first optical pulse to exit the time slot interchanger will be shifted and/or switched through without any temporary storage. However, since one does not know in advance which bit position in a frame will be the first to exit the time slot interchanger, provision must be made to store all bit positions temporarily. Three clocks are required for the serial-to-parallel converter. Each optical memory cell has its own clock. The clock rates were discussed above.

A variety of 1×2 optical switches may be used in optical time slot interchanger 10 and its component optical memory cells. At the present time, electrooptic switches, such as LiNbO₃-based directional couplers and cross-couplers, are good candidates for this application because their technologies are relatively mature compared with those of pure optical switching elements. A pure optical switching element, such as a nonlinear optical coupler, as described in Friberg et al., "An ultrafast all-optical switch," Photonic Switching, Springer Series in Electronics and Photonics 25, pp. 92–94, 1988, will be a better element to use when it becomes available and practical.

The concept, structure and operational principle of the optical time slot interchanger described herein are independent of the technology used to implement it. The optical time slot interchanger 10 of the present invention can be implemented not only having discrete components, as shown in FIG. 1, but also using integrated optics technology, or other advanced technologies.

A variety of photonic systems, subsystems and/or components can be implemented which are based on and/or utilize the optical time slot interchanger of the present invention. The optical time slot interchanger is a needed building block for photonic switching. It enables a variety of optical switching architectures which were not considered feasible before. For example, in existing optical time-division switching architectures, the time slot interchanges are accomplished by using the demultiplexing/storing/retrieving/multiplexing procedure, as discussed supra in the Background of the Invention. New optical switching architectures equipped with optical time slot interchangers will no longer need the demultiplexing process.

The novel optical time slot interchanger of the present invention offers many features and advantages over prior art devices, most of which were not optical devices. A frame of serial optical pulses is time slot interchanged in bit interleaved format without optical-to-electrical or electrical-to-optical conversion. The adjacent optical pulses are well isolated, causing no crosstalk among time slots. This optical time slot interchanger can be implemented using integrated optics technology, principally because the physical length of the optic fiber is short. The speed of the optical time slot interchanger may be adjusted according to the incoming optical data rate. And timing control of this novel optical time slot interchanger is relatively easy and simple.

I claim:

1. An optical time slot interchanger for interchanging optical pulses in a bit-interleaved format, comprising:
    an N bit optical serial-to-parallel converter serving as input means to said time slot interchanger, said N bit optical serial-to-parallel converter comprising:
        N single bit optical shift registers, each of said shift registers having an input port adapted to receive optical pulses and an output port adapted to output optical pulses responsive to control signals;
        means to optically couple said N optical shift registers in cascade such that the output port of one optical shift register is optically coupled to the input port of the next sequential optical shift register in said cascade, and the input port of the first optical shift register in said cascade serves as the input port of said converter;

means to load and shift each pulse of a frame of N optical pulses received serially at the input port of the first optical shift register of said cascade into said cascaded optical shift registers until each of said N optical shift registers has stored one of said N optical pulses;

N first optical switching means, each of which has an input end optically coupled to an output of one of said optical shift registers, and a first output end optically coupled to the input port of the next sequential optical shift register in said cascade, and a second output end serving as an output port of said serial-to-parallel converter;

such that said serial-to-parallel converter is adapted to receive serially and store temporarily each frame of N optical pulses, having an input port adapted to receive optical pulses serially and N output ports adapted to output said N optical pulses in parallel, responsive to control signals; said converter serving as input means to said time slot interchanger;

N single-bit optical memory cells each of which is optically coupled to one of said output ports of said optical serial-to-parallel converter; said optical memory cells serving as optical storage means to store N optical pulses of a frame as outputted from said optical serial-to-parallel converter;

optical output means optically coupled to said optical storage means adapted to output said N optical pulses serially, interchanging the positions of said optical pulses in said frame, whereby the time slots of said optical pulses in said frame are interchanged in a bit-interleaved format; and control means to load and shift each of said N serial optical pulses received at the input of said optical converter into said converter, from said converter into said optical storage means, and from said optical storage means to said optical output means; said control means adapted to provide signals to control the input, storage and output of said optical pulses.

2. The optical time slot interchanger of claim 1 wherein said optical output means of said optical time slot interchanger comprises:

an output port; and

N second optical switching means, each having an input end optically coupled to said optical storage means, a first output end optically coupled to said optical storage means and a second output end optically coupled to said output port, said switching means being adapted to switchably couple optical pulses from said input end to said output ends responsive to control signals from said control means.

3. The optical time lot interchanger of claim 1 wherein said control means comprises:

first and second clock means to provide control signals to said optical serial-to-parallel converter input means;

said first and second clock means operating at the same clock rate, but said first and second clock means being out of phase with each other;

said first and second clock means controlling the entry of an optical pulse to said optical input means;

a third clock means to provide control signals for the parallel output of said optical pulses from said optical input means to said optical storage means;

fourth and fifth clock means to provide control signals for the serial output of optical pulses to said optical output means;

said fourth and fifth clock means operating at the same clock rate, but said fourth and fifth clock means being out of phase with each other;

whereby the time slot interchange of a series of optical pulse in a frame is effected.

4. The optical time slot interchanger of claim 1 wherein each of said single bit optical shift registers comprises:

at least two optical memory cells, each of said optical memory cells having an input port and an output port;

means to optically couple said optical memory cells in cascade;

each of said optical memory cells having clock means operating at the same clock rate, but each clock means being out of phase with said clock means in the next sequential optical memory cell;

said clock means controlling the entry of an optical pulse to each of said optical memory cells and the exit of said optical pulse from each of said optical memory cells;

whereby the shifting of an optical pulse results from its exit from a first optical memory cell and its entry into the next sequential optical memory cell.

5. The optical time slot interchanger of claim 4 wherein said first and second optical switching means are electro-optical switches.

6. The optical time slot interchanger of claim 4 wherein said first and second optical switching means are directional couplers.

* * * * *